(12) United States Patent
Zhang et al.

(10) Patent No.: US 12,542,744 B2
(45) Date of Patent: Feb. 3, 2026

(54) NETWORK CONGESTION CONTROL METHOD AND RELATED APPARATUS

(71) Applicant: Huawei Technologies Co., Ltd., Shenzhen (CN)

(72) Inventors: Yali Zhang, Beijing (CN); Shixing Liu, Beijing (CN); Di Qu, Beijing (CN); Mengzhu Liu, Beijing (CN)

(73) Assignee: HUAWEI TECHNOLOGIES CO. LTD., Shenzhen (CN)

( * ) Notice: Subject to any disclaimer, the term of this patent is extended or adjusted under 35 U.S.C. 154(b) by 56 days.

(21) Appl. No.: 18/767,064

(22) Filed: Jul. 9, 2024

(65) Prior Publication Data
US 2024/0364634 A1 Oct. 31, 2024

Related U.S. Application Data

(63) Continuation of application No. PCT/CN2023/070595, filed on Jan. 5, 2023.

(30) Foreign Application Priority Data

Jan. 27, 2022 (CN) .......................... 202210104949.0

(51) Int. Cl.
*H04L 47/20* (2022.01)
*H04L 47/11* (2022.01)
*H04L 47/24* (2022.01)

(52) U.S. Cl.
CPC ............ *H04L 47/20* (2013.01); *H04L 47/115* (2013.01); *H04L 47/24* (2013.01)

(58) Field of Classification Search
CPC ....... H04L 47/20; H04L 47/115; H04L 47/24; H04L 47/11; H04L 47/12; H04L 47/122; H04L 47/25; H04L 47/2425
See application file for complete search history.

(56) References Cited

U.S. PATENT DOCUMENTS

| | | | |
|---|---|---|---|
| 9,374,289 B2 | 6/2016 | Kotecha et al. | |
| 2008/0002592 A1* | 1/2008 | Yegani | H04L 47/2433 370/252 |
| 2019/0386924 A1 | 12/2019 | Srinivasan et al. | |
| 2021/0281524 A1* | 9/2021 | Zhang | H04L 47/762 |
| 2022/0053381 A1* | 2/2022 | Xiong | H04W 28/0236 |
| 2023/0247485 A1* | 8/2023 | Dévai | H04W 28/02 370/229 |
| 2024/0267324 A1* | 8/2024 | Hao | H04L 45/123 |

FOREIGN PATENT DOCUMENTS

CN 103139070 A 6/2013

* cited by examiner

*Primary Examiner* — Farzana B Huq
(74) *Attorney, Agent, or Firm* — Conley Rose, P.C.

(57) ABSTRACT

A network congestion control method includes, during transmission of a first service flow, a first network device that obtains a measurement packet including groups of measurement results corresponding to the first service flow, and each group includes an identifier of a forwarding device on a forwarding path of the first service flow and a measurement value corresponding to the forwarding device. The first network device determines, based on the groups, a congested second network device on the forwarding path. The first network device determines a control policy based on location information of the second network device, where the control policy resolves congestion of the first service flow.

20 Claims, 6 Drawing Sheets

NETWORK CONGESTION CONTROL METHOD AND RELATED APPARATUS

CROSS-REFERENCE TO RELATED APPLICATIONS

This is a continuation application of International Patent Application No. PCT/CN2023/070595 filed on Jan. 5, 2023, which claims priority to Chinese Patent Application No. 202210104949.0 filed on Jan. 27, 2022. The disclosures of the aforementioned applications are hereby incorporated by reference in their entireties.

TECHNICAL FIELD

This application relates to the field of communication technologies, and in particular, to a network congestion control method and a related apparatus.

BACKGROUND

In a current data center network, computing resources and storage resources can be clearly divided, to ensure that a user obtains needed (or purchased) computing resources and/or storage resources, but there is no technical solution for ensuring a service-level agreement (SLA).

However, burst congestion often occurs on the data center network, causing a severe bandwidth loss and a long-tail latency of services. In addition, the long-tail latency also increases a service failure rate. How to ensure SLA performance of the services when the congestion occurs is a technical problem that needs to be urgently resolved.

SUMMARY

This application provides a network congestion control method and a related apparatus, to provide differentiated performance assurance for a service flow when network congestion occurs.

According to a first aspect of this application, a network congestion control method is provided. The method includes the following. A first network device obtains a measurement packet, where the measurement packet includes a plurality of groups of measurement results corresponding to a first service flow, and each group of measurement results includes an identifier of a forwarding device on a forwarding path of the first service flow and a measurement value corresponding to the forwarding device. The first network device determines, based on the plurality of groups of measurement results, a congested second network device on the forwarding path. The first network device determines a control policy based on location information of the second network device, where the control policy is used to resolve congestion that affects the first service flow. The location information of the second network device indicates a role of the second network device on the forwarding path. It can be learned that, according to the technical solution provided in this application, which forwarding devices on the forwarding path corresponding to the first service flow are congested may be learned, then different control policies are determined based on congestion at different locations, and the congestion that affects the first service flow is resolved by using the control policies, so that transmission performance of the first service flow is ensured.

The role of the second network device on the forwarding path may include a last-hop network device or an intermediate network device, and the control policy may include replacing the forwarding path or reducing a sending rate of the service flow.

In an implementation, when the second network device is the intermediate network device and the first network device has another forwarding path that can be used as a replacement, the method further includes the following. The first network device replaces the forwarding path of the first service flow according to the control policy. In this implementation, when the second network device is the intermediate network device on the forwarding path and the first network device has the other forwarding path that can be used as a replacement, the forwarding path of the first service flow is replaced, to forward the first service flow through a forwarding path after replacement, and resolve the congestion of the first service flow.

In an implementation, when the second network device is the last-hop network device, or when the second network device is the intermediate network device and the first network device has no other forwarding path that can be used as a replacement, the method further includes the following. The first network device controls, according to the control policy, a target transmit end to reduce a sending rate of a target service flow. The target transmit end includes a first transmit end and/or a second transmit end, the target service flow includes the first service flow and/or a second service flow, the first transmit end is configured to send the first service flow, and the second transmit end is configured to send the second service flow. In addition, the second service flow and the first service flow correspond to a same queue in the second network device, and a current sending rate of the second service flow is greater than a subscription rate. In this implementation, when the second network device is the last-hop network device on the forwarding path, or the second network device is the intermediate network device on the forwarding path but the first network device has no other forwarding path that can be used as a replacement, the target transmit end is controlled to reduce the sending rate of the target service flow, to resolve the congestion of the first service flow.

There may be the following implementations in which the first network device controls, according to the control policy, the target transmit end to reduce the rate of the target service flow.

An implementation includes the following. The first network device determines a first expected sending rate of the first service flow based on a quantity of received first-type packets, where the first expected sending rate is less than a current sending rate of the first service flow, and the first-type packet is a packet that includes a congestion mark and that belongs to the first service flow. The first network device sends the first expected sending rate to the first transmit end, to enable the first transmit end to send the first service flow based on the first expected sending rate.

Another implementation includes the following. The first network device determines a second expected sending rate of the second service flow based on a quantity of received second-type packets, where the second expected sending rate is less than the current sending rate of the second service flow, and the second-type packet is a packet that includes a congestion mark and that belongs to the second service flow. The first network device sends the second expected sending rate to the second transmit end, to enable the second transmit end to send the second service flow based on the second expected sending rate.

Still another implementation includes the following. The first network device obtains a sending rate and a subscription rate of the target service flow in a current statistical periodicity. The first network device adds, based on the sending rate and the subscription rate of the target service flow, a target mark to a packet corresponding to the target service flow, where the target mark indicates a relationship between the sending rate and the subscription rate of the target service flow. The first network device sends, through a forwarding path of the target service flow, the packet to which the target mark is added, to enable a receive end of the target service flow to send a rate reduction notification to the target transmit end based on a congestion mark in the packet, where the rate reduction notification indicates the target transmit end to reduce the sending rate of the target service flow. The congestion mark in the packet is added by the second network device based on the target mark in the packet.

In an implementation, that the first network device adds, based on the sending rate and the subscription rate of the target service flow, the target mark to the packet corresponding to the target service flow includes the following. When the sending rate of the target service flow is less than the subscription rate, a first mark is added to the packet. When the sending rate of the target service flow is greater than or equal to the subscription rate, and the sending rate is greater than a sending rate of the target service flow in a previous statistical periodicity, a second mark is added to the packet.

In an implementation, the method further includes the following. When the sending rate of the target service flow is greater than or equal to the subscription rate, the sending rate of the target service flow is less than the sending rate of the target service flow in the previous statistical periodicity, and a difference between the sending rate of the target service flow in the previous statistical periodicity and the sending rate of the target service flow in the current statistical periodicity is greater than a first threshold, the first mark is added to the packet.

In an implementation, the method further includes the following. When the sending rate of the target service flow is greater than or equal to the subscription rate, the sending rate of the target service flow is less than the sending rate of the target service flow in the previous statistical periodicity, and a difference between the sending rate of the target service flow in the previous statistical periodicity and the sending rate of the target service flow in the current statistical periodicity is less than a second threshold, the second mark is added to the packet.

In an implementation, that the first network device replaces the forwarding path of the first service flow according to the control policy includes the following. When receiving a flowlet corresponding to the first service flow, the first network device determines a target forwarding path, where load of the target forwarding path is less than a load threshold. The first network device forwards the flowlet through the target forwarding path.

In an implementation, the method further includes the following. The first network device updates a flow table corresponding to the first service flow, where the flow table includes an egress port identifier corresponding to the target forwarding path.

In an implementation, the method further includes the following. The first network device determines a transmission latency of the first service flow based on the plurality of groups of measurement results. When the transmission latency is greater than a subscription latency, the first network device adds a latency non-compliance mark to a packet corresponding to the first service flow. The first network device forwards the packet through the forwarding path, to enable the forwarding device on the forwarding path to add, after receiving the packet, the latency non-compliance mark and a smallest subscription latency to a packet corresponding to the second service flow that passes through the same queue as the first service flow, where the smallest subscription latency is a smallest latency in subscription latencies corresponding to different service flows that pass through the same queue.

In an implementation, the method further includes the following. When the first network device receives a third-type packet carrying the latency non-compliance mark, the first network device determines a third expected transmission rate based on a smallest subscription latency in the third-type packet and a transmission latency of a service flow corresponding to the third-type packet. The first network device sends the third expected rate to a transmit end of the service flow corresponding to the third-type packet, to enable the transmit end to send the service flow based on the third expected rate.

According to a second aspect of this application, a network congestion control apparatus is provided. The apparatus includes an obtaining unit configured to obtain a measurement packet, where the measurement packet includes a plurality of groups of measurement results corresponding to a first service flow, and each group of measurement results includes an identifier of a forwarding device on a forwarding path of the first service flow and a measurement value corresponding to the forwarding device, a first determining unit configured to determine, based on the plurality of groups of measurement results, a congested second network device on the forwarding path, and a second determining unit configured to determine a control policy based on location information of the second network device, where the control policy is used to resolve congestion that affects the first service flow, and the location information of the second network device indicates a role of the second network device on the forwarding path.

In an implementation, the role of the second network device on the forwarding path includes a last-hop network device or an intermediate network device. When the second network device is the intermediate network device and the first network device has another forwarding path that can be used as a replacement, the apparatus further includes a replacement unit configured to replace the forwarding path of the first service flow according to the control policy. When the second network device is the last-hop network device, or when the second network device is the intermediate network device and the first network device has no other forwarding path that can be used as a replacement, the apparatus further includes a control unit configured to control, according to the control policy, a target transmit end to reduce a sending rate of a target service flow, where the target transmit end includes a first transmit end and/or a second transmit end, the target service flow includes the first service flow and/or a second service flow, the first transmit end is configured to send the first service flow, the second transmit end is configured to send the second service flow, the second service flow and the first service flow correspond to a same queue in the second network device, and a current sending rate of the second service flow is greater than a subscription rate.

In an implementation, the control unit is further configured to determine a first expected sending rate of the first service flow based on a quantity of received first-type packets, where the first expected sending rate is less than a current sending rate of the first service flow, and the first-type packet is a packet that includes a congestion mark and that belongs to the first service flow, and send the first expected sending rate to the first transmit end, to enable the first transmit end to send the first service flow based on the first expected sending rate.

In an implementation, the control unit is further configured to determine a second expected sending rate of the second service flow based on a quantity of received second-type packets, where the second expected sending rate is less than the current sending rate of the second service flow, and the second-type packet is a packet that includes a congestion mark and that belongs to the second service flow, and send the second expected sending rate to the second transmit end, to enable the second transmit end to send the second service flow based on the second expected sending rate.

In an implementation, the control unit is further configured to obtain a sending rate and a subscription rate of the target service flow in a current statistical periodicity, add, based on the sending rate and the subscription rate of the target service flow, a target mark to a packet corresponding to the target service flow, where the target mark indicates a relationship between the sending rate and the subscription rate of the target service flow, and send, through a forwarding path of the target service flow, the packet to which the target mark is added, to enable a receive end of the target service flow to send a rate reduction notification to the target transmit end based on a congestion mark in the packet, where the rate reduction notification indicates the target transmit end to reduce the sending rate of the target service flow, and the congestion mark in the packet is added by the second network device based on the target mark in the packet.

In an implementation, the control unit is further configured to, when the sending rate of the target service flow is less than the subscription rate, add a first mark to the packet, or when the sending rate of the target service flow is greater than or equal to the subscription rate, and the sending rate is greater than a sending rate of the target service flow in a previous statistical periodicity, add a second mark to the packet.

In an implementation, the control unit is further configured to, when the sending rate of the target service flow is greater than or equal to the subscription rate, the sending rate of the target service flow is less than the sending rate of the target service flow in the previous statistical periodicity, and a difference between the sending rate of the target service flow in the previous statistical periodicity and the sending rate of the target service flow in the current statistical periodicity is greater than a first threshold, add the first mark to the packet.

In an implementation, the control unit is further configured to, when the sending rate of the target service flow is greater than or equal to the subscription rate, the sending rate of the target service flow is less than the sending rate of the target service flow in the previous statistical periodicity, and a difference between the sending rate of the target service flow in the previous statistical periodicity and the sending rate of the target service flow in the current statistical periodicity is less than a second threshold, add the second mark to the packet.

In an implementation, the replacement unit is further configured to determine a target forwarding path when receiving a flowlet corresponding to the first service flow, where load of the target forwarding path is less than a load threshold, and forward the flowlet through the target forwarding path.

In an implementation, the apparatus further includes an update unit configured to update a flow table corresponding to the first service flow, where the flow table includes an egress port identifier corresponding to the target forwarding path.

In an implementation, the apparatus further includes a third determining unit, an adding unit, and a sending unit.

The third determining unit is configured to determine a transmission latency of the first service flow based on the plurality of groups of measurement results. When the transmission latency is greater than a subscription latency, the adding unit is configured to add a latency non-compliance mark to a packet corresponding to the first service flow. The sending unit is configured to forward the packet through the forwarding path, to enable the forwarding device on the forwarding path to add, after receiving the packet, the latency non-compliance mark and a smallest subscription latency to a packet corresponding to the second service flow that passes through the same queue as the first service flow, where the smallest subscription latency is a smallest latency in subscription latencies corresponding to different service flows that pass through the same queue.

In an implementation, the apparatus further includes a fourth determining unit and a sending unit.

The fourth determining unit is configured to, when receiving a third-type packet carrying the latency non-compliance mark, determine a third expected transmission rate based on a smallest subscription latency in the third-type packet and a transmission latency of a service flow corresponding to the third-type packet. The sending unit is configured to send the third expected rate to a transmit end of the service flow corresponding to the third-type packet, to enable the transmit end to send the service flow based on the third expected rate.

According to a third aspect of this application, a network device is provided. The device includes a processor and a memory, where the memory is configured to store instructions or a computer program, and the processor is configured to execute the instructions or the computer program in the memory, to enable the network device to perform the method according to any one of the first aspect or the implementations of the first aspect.

According to a fourth aspect of this application, a computer-readable storage medium is provided, where the computer-readable storage medium includes instructions. When the instructions are run on a computer, the computer is enabled to perform the method according to any one of the first aspect or the implementations of the first aspect.

According to a fifth aspect of this application, a network system is provided, where the network system includes a first network device and a second network device. The first network device is configured to obtain a measurement packet, where the measurement packet includes a plurality of groups of measurement results corresponding to a first service flow, and each group of measurement results includes an identifier of a forwarding device on a forwarding path of the first service flow and a measurement value corresponding to the forwarding device, determine, based on the plurality of groups of measurement results, the congested second network device on the forwarding path, and determine a control policy based on location information of the second network device, where the control policy is used to resolve congestion that affects the first service flow, and the location information of the second network device indicates a role of the second network device on the forwarding path.

In an implementation, the role of the second network device on the forwarding path includes a last-hop network device or an intermediate network device. When the second network device is the intermediate network device and the first network device has another forwarding path that can be used as a replacement, the first network device is further configured to replace the forwarding path of the first service flow according to the control policy. When the second network device is the last-hop network device, or when the second network device is the intermediate network device and the first network device has no other forwarding path that can be used as a replacement, the first network device is further configured to control, according to the control policy, a target transmit end to reduce a sending rate of a target service flow, where the target transmit end includes a first transmit end and/or a second transmit end, the target service flow includes the first service flow and/or a second service flow, the first transmit end is configured to send the first service flow, the second transmit end is configured to send the second service flow, the second service flow and the first service flow correspond to a same queue in the second network device, and a current sending rate of the second service flow is greater than a subscription rate.

In an implementation, when controlling, according to the control policy, the target transmit end to reduce the sending rate of the target service flow, the first network device is configured to obtain a sending rate and a subscription rate of the target service flow in a current statistical periodicity, add, based on the sending rate and the subscription rate of the target service flow, a target mark to a packet corresponding to the target service flow, where the target mark indicates a relationship between the sending rate and the subscription rate of the target service flow, and send, through a forwarding path of the target service flow, the packet to which the target mark is added.

The second network device is configured to add a congestion mark to the packet based on the target mark in the packet, and send, through the forwarding path of the target service flow, the packet to which the congestion mark is added, to enable a receive end of the target service flow to send a rate reduction notification to the target transmit end based on the congestion mark in the packet, where the rate reduction notification indicates the target transmit end to reduce the sending rate of the target service flow.

According to the technical solutions provided in this application, during transmission of the first service flow, the first network device obtains the measurement packet, where the measurement packet includes the plurality of groups of measurement results corresponding to the first service flow, and each group of measurement results includes the identifier of the forwarding device on the forwarding path of the first service flow and the measurement value corresponding to the forwarding device. The first network device determines, based on the plurality of groups of measurement results in the measurement packet, the congested second network device on the forwarding path. After determining the congested second network device, the first network device determines the control policy based on the location information of the second network device, where the control policy is used to resolve the congestion that affects the first service flow, and the location information of the second network device indicates the role of the second network device on the forwarding path. For example, the second network device is the intermediate network device on the forwarding path, or the second network device is the last-hop network device on the forwarding path. It can be learned that, according to the technical solutions provided in this application, which forwarding devices on the forwarding path corresponding to the first service flow are congested may be learned, then different control policies are determined based on congestion at different locations, and the congestion that affects the first service flow is resolved by using the control policies, so that transmission performance of the first service flow is ensured.

BRIEF DESCRIPTION OF DRAWINGS

To describe the technical solutions in some embodiments of this application more clearly, the following briefly describes accompanying drawings for describing the embodiments. It is clear that the accompanying drawings in the following descriptions show merely some embodiments recorded in this application, and a person of ordinary skill in the art may further derive another drawing from these accompanying drawings without creative efforts.

DESCRIPTION OF EMBODIMENTS

Figure 1:
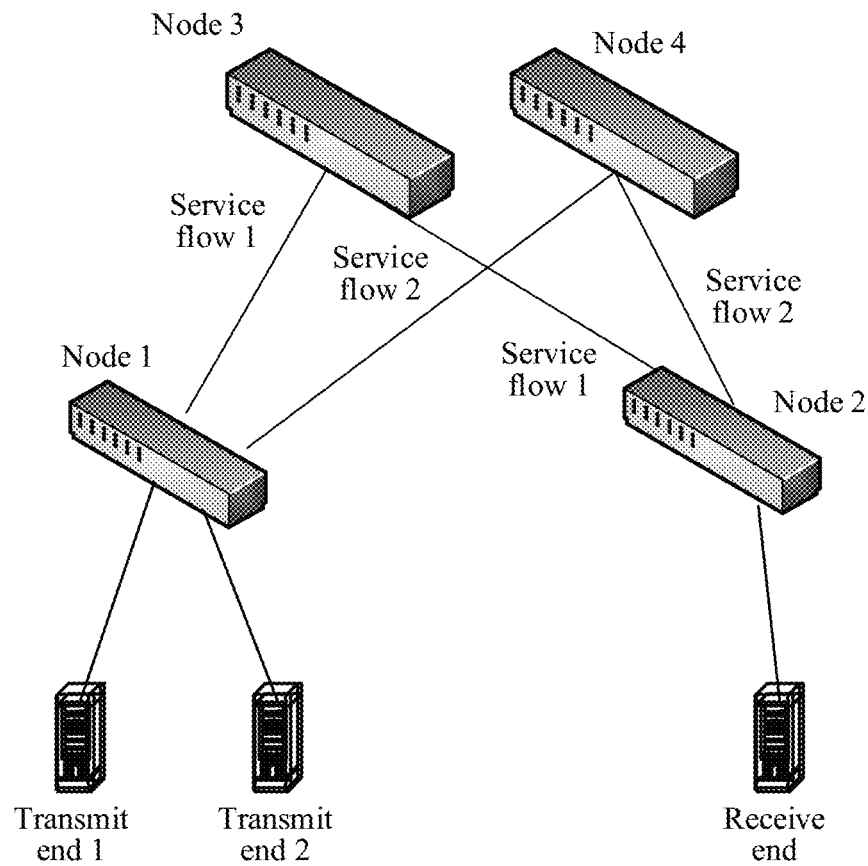
FIG. 1 is a schematic diagram of an application scenario according to an embodiment of this application.

For ease of understanding of technical solutions provided in embodiments of this application, the following describes a technical background of this application.

An SLA is a contract or an agreement signed between a service provider and a tenant, and is used to specify a service indicator that can be provided by the service provider to ensure service transmission of the tenant. Further, the SLA may include indicators such as packet transmission bandwidth and a transmission latency.

During actual application, burst congestion may occur on a network, causing a severe bandwidth loss and a long-tail latency on the network. Usually, a service needs to transmit and process all data packets within specified time to complete a corresponding task. However, the long-tail latency may cause processing duration of the service to exceed the specified time, and increase a service transmission failure rate. Consequently, SLA performance of a service flow cannot be ensured due to the network congestion. The following several solutions are provided, and are separately described below.

In one solution, a receive end and a transmit end perform rate coordination, to provide differentiated rate allocation. The receive end allocates, based on a SLA requirement of a service flow, a local egress port capability to a transmit end corresponding to each service flow. For example, an ingress port of the receive end receives two service flows in total, and bandwidth of the ingress port is 10 gigabits per second (Gbps). An SLA bandwidth requirement of a first service flow is 2 Gbps, and an SLA bandwidth requirement of a second service flow is 4 Gbps. In this case, 2 Gbps is first allocated to the first service flow, 4 Gbps is allocated to the second service flow, and remaining 4 Gbps bandwidth is evenly allocated to the two service flows. Finally, bandwidth allocated to the first service flow is 4 Gbps, and bandwidth allocated to the second service flow is 6 Gbps. The receive end sends a bandwidth allocation result to a transmit end of the first service flow and a transmit end of the second service flow. After receiving the allocation result, each transmit end sends the service flow based on the bandwidth corresponding to the allocation result.

For SLA latency assurance, the transmit end measures end-to-end round-trip time (RTT) by using a special packet. The RTT is a total latency from sending data by the transmit end to receiving, by the transmit end, an acknowledgment from the receive end (the receive end immediately sends the acknowledgment after receiving the data). When the RTT exceeds a latency threshold, a sending rate is reduced based on a subscription latency in the SLA. For example, if currently measured RTT is 100 microseconds (μs) and the subscription latency is 20 μs, the rate at which the transmit end sends the service flow is reduced to 20% of the original rate.

In the other solution, SLA bandwidth is ensured by allocating queues. In an example, the receive end allocates a queue to a tenant having an SLA requirement, and adjusts a weight of the queue to ensure bandwidth of each tenant. For example, if an SLA bandwidth requirement of a tenant 1 is 2 Gbps and an SLA bandwidth requirement of a tenant 2 is 5 Gbps, a weight 2:5 is configured to ensure differentiated bandwidth.

For SLA latency assurance, slots are allocated. A transmit end sends a slot reservation notification to a network device, and the network device on a forwarding path allocates slots to service flows of different transmit ends, to ensure that no conflict occurs when each service flow enters the network device, and ensure the latency.

In the foregoing first solution, a network congestion status may be determined by measuring the RTT of the receive end. However, due to load imbalance or in a special network model, an intermediate network device may also be congested. The congestion on the intermediate network device cannot be resolved by adjusting bandwidth allocation at the receive end.

The foregoing second solution is applicable to a case in which there are a small quantity of tenants on the network. However, there are actually a large quantity of tenants on the network, but currently there are only eight queues for forwarding devices. Consequently, a plurality of tenants share a same queue, and it is difficult to implement differentiated control. In addition, when latency assurance is performed based on network slot allocation, a global clock needs to be synchronized, and costs are high. In addition, resource reservation may cause resource waste, and is difficult to deploy.

Based on this, an embodiment of this application provides a network congestion control method, to resolve a network-wide congestion problem and meet an SLA requirement of a service. Further, a first network device in a network obtains a measurement packet, where the measurement packet includes a plurality of groups of measurement results corresponding to a first service flow, each group of measurement results includes an identifier of a forwarding device on a forwarding path of the first service flow and a measurement value corresponding to the forwarding device, and the measurement value may be used to determine whether congestion occurs on the forwarding device. After obtaining the measurement packet, the first network device determines, based on the plurality of groups of measurement results in the measurement packet, a congested second network device on the forwarding path. In an example, the first network device may determine, based on the plurality of groups of measurement results, which forwarding devices on the forwarding path are congested, to implement network-wide congestion awareness. After determining the congested second network device, the first network device determines a control policy based on location information of the second network device, where the control policy is used to resolve congestion that affects the first service flow. The location information of the second network device indicates a role of the second network device on the forwarding path. In other words, the first network device determines different control policies based on different congestion locations, to resolve a congestion problem of the first service flow by using the control policy, and ensure transmission performance of the first service flow.

The following clearly and completely describes the technical solutions in embodiments of this application with reference to the accompanying drawings in embodiments of this application. It is clear that the described embodiments are merely some but not all of embodiments of this application.

FIG. 1 is a schematic diagram of an application scenario according to an embodiment of this application. A data center network including seven network devices is used as an example for description. The data center network includes a transmit end 1, a transmit end 2, a receive end, a node 1, a node 2, a node 3, and a node 4. The transmit end 1, the transmit end 2, and the receive end may be servers, and the node 1 to the node 4 may be switches. The transmit end 1 sends a service flow 1 to the receive end through the node 1, the node 3, and the node 2, that is, a forwarding path corresponding to the service flow 1 is the node 1—the node 3—the node 2. The transmit end 2 sends a service flow 2 to the receive end through the node 1, the node 4, and the node 2, that is, a forwarding path corresponding to the service flow 2 is the node 1—the node 4—the node 2.

In this embodiment, the first network device may be the node 1 in FIG. 1. To measure end-to-end congestion information, the node 1 may duplicate a packet of the service flow 1 and a packet of the service flow 2, and add an extension field to each packet. When a packet is transmitted on a forwarding path corresponding to the packet, each forwarding device on the forwarding path may add an extension field to the packet, to reflect transmission information of the forwarding device by using the field. For example, an in-band network telemetry (INT) field is added to the packet. The INT field may include an identifier of the forwarding device and a measurement value corresponding to the forwarding device. The measurement value may include a queue length and bandwidth information of an egress port corresponding to a queue. The bandwidth information of the egress port includes information related to bandwidth of the egress port, including but not limited to total bandwidth of the egress port, total occupied bandwidth of the egress port, remaining bandwidth of the egress port, a service flow that uses the egress port, bandwidth occupied by the service flow, and the like.

Figure 2:
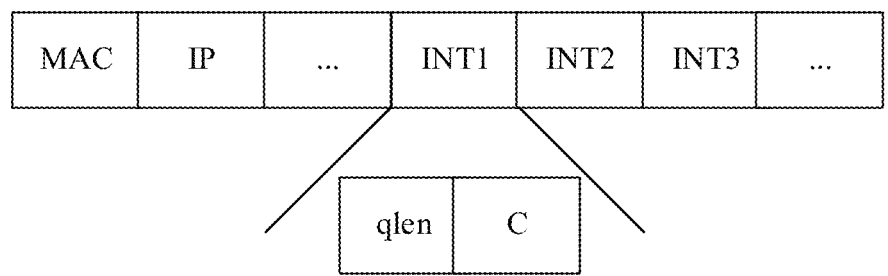
FIG. 2 is a schematic diagram of a structure of a measurement packet according to an embodiment of this application.

For case of understanding, the following uses the service flow 1 as an example for description. The node 1 duplicates a packet 1 of the service flow 1, adds an INT field to the packet 1, and forwards the packet 1 through the forwarding path corresponding to the service flow 1. After receiving the packet 1, the node 3 and the node 2 on the forwarding path respectively add corresponding INT fields to the packet. For example, as shown in FIG. 2, the node 1 adds INT1 to the packet 1 to obtain a measurement packet, the node 3 adds INT2 to the received measurement packet, and the node 2 adds INT3 to the received measurement packet. Each INT field includes a queue length qlen and egress port bandwidth C. A unit of the queue length is kilobytes (KB), and a unit of the egress port bandwidth is Gbps. After encapsulating the INT field, the node 2 feeds back the measurement packet to the node 1, so that the node 1 may determine a congestion point based on a plurality of INT fields in the measurement packet. The node 2 may return the measurement packet to the node 1 along the original path, or may return the measurement packet to the node 1 along another path. This is not limited in this embodiment.

Further, the node 1 determines, based on the queue length and the bandwidth information of the egress port in each INT field in the received measurement packet, whether congestion occurs in the forwarding device that adds the INT field, to determine a congestion node. After determining the congestion node, the node 1 determines, based on a location of the congestion node on the forwarding path, a control policy for resolving the congestion. When the congestion node is an intermediate node on the forwarding path, the congestion may be resolved in a manner of replacing the forwarding path. For example, if the congestion occurs on the node 3, the node 1 forwards the packet of the service flow 1 through the node 4, to ensure an SLA of the service flow 1. When the congestion node is a last-hop node on the forwarding path, or the congestion node is an intermediate node but there is no path that can be used as a replacement, the transmit end 1 may be controlled to reduce a sending rate of the service flow 1.

Figure 3:
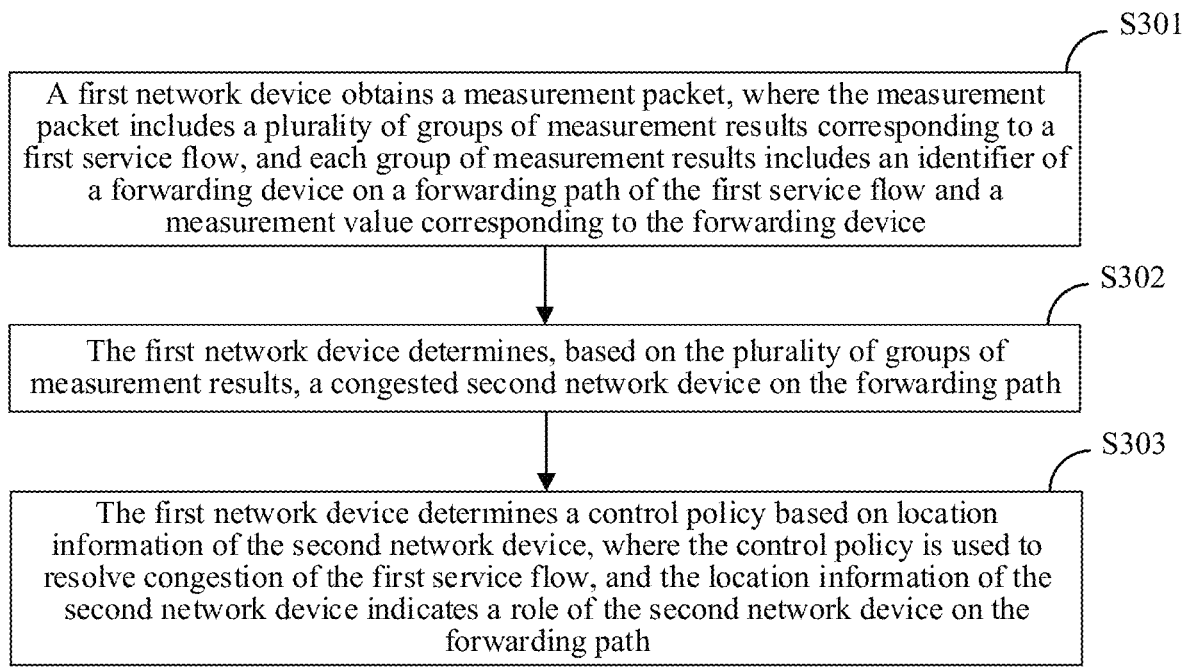
FIG. 3 is a schematic flowchart of a network congestion control method according to an embodiment of this application.

Based on the application scenario shown in FIG. 1, this application provides a network congestion control method. As shown in FIG. 3, the method may include the following steps.

S301: A first network device obtains a measurement packet, where the measurement packet includes a plurality of groups of measurement results corresponding to a first service flow, and each group of measurement results includes an identifier of a forwarding device on a forwarding path of the first service flow and a measurement value corresponding to the forwarding device.

In this embodiment, the measurement packet obtained by the first network device includes a plurality of groups of measurement results corresponding to a first service flow, and each group of measurement results includes an identifier of a forwarding device on a forwarding path of the first service flow and a measurement value corresponding to the forwarding device. The measurement value is used to determine whether congestion occurs on the forwarding device that adds the measurement value. The measurement value may include a queue length corresponding to the first service flow on the forwarding device and bandwidth information of an egress port corresponding to a queue.

A process in which the first network device obtains the measurement packet is as follows. When receiving a packet of the first service flow, the first network device duplicates the packet, adds the measurement result of the first network device to the packet to obtain the measurement packet, and forwards the measurement packet through the forwarding path corresponding to the first service flow until the measurement packet reaches a last-hop network device on the forwarding path. After receiving the measurement packet, each forwarding device on the forwarding path adds a measurement result corresponding to the forwarding device to the measurement packet. After adding the measurement result to the packet, the last-hop network device returns the measurement packet to the first network device. When returning the measurement packet to the first network device, the last-hop network device may return the measurement packet to the first network device along the original path, or may return the measurement packet to the first network device along another path. For example, the first network device may be the node 1 in FIG. 2, and the last-hop network device is the node 2 in FIG. 2.

S302: The first network device determines, based on the plurality of groups of measurement results, a congested second network device on the forwarding path.

After receiving the measurement packet, the first network device determines, based on the measurement value in each group of measurement results in the measurement packet, whether congestion occurs on the forwarding device corresponding to the group of measurement results, so that the first network device can be aware of which forwarding devices on the forwarding path are congested.

S303: The first network device determines a control policy based on location information of the second network device, where the control policy is used to resolve congestion of the first service flow, and the location information of the second network device indicates a role of the second network device on the forwarding path.

The control policy may be, for example, replacing the forwarding path or reducing a sending rate of the service flow.

After determining that the congestion occurs on the forwarding device in the forwarding path of the first service flow, the first network device determines the control policy based on the location information of the congested second network device, to resolve, by using the control policy, the congestion that affects the first service flow. The location information of the second network device indicates a role of the second network device on the forwarding path. The role of the second network device on the forwarding path includes a last-hop network device or an intermediate network device. For example, if the first service flow is the service flow 1 in FIG. 1, when the second network device is the intermediate network device, the second network device may be the node 3, or when the second network device is the last-hop network device, the second network device may be the node 2. If the first service flow is the service flow 2 in FIG. 1, when the second network device is the intermediate network device, the second network device may be the node 4, or when the second network device is the last-hop network device, the second network device may be the node 2.

The first network device may determine the control policy based on the location information of the second network device in the following two cases. In one case, when the second network device is the intermediate network device and the first network device has another forwarding path that can be used as a replacement, the corresponding control policy is replacing the forwarding path. For example, if the first network device is the node 1 in FIG. 2, the first service flow is the service flow 1, and congestion occurs on the node 3, the node 1 may forward the service flow 1 through the node 4. In the other case, when the second network device is the last-hop network device, or when the second network device is the intermediate network device but the first network device has no other forwarding path that can be used as a replacement, the corresponding control policy may be controlling a transmit end to reduce the sending rate of the first service flow. For example, if the second network device is the node 2, and the first service flow is the service flow 1, the node 1 controls, according to the control policy, the transmit end 1 to reduce a sending rate of the service flow 1. Alternatively, the second network device is the node 3, the first service flow is the service flow 1, and congestion also occurs on the node 4. If the node 1 forwards the service flow 1 through the node 4, a congestion degree of the node 4 is increased. In this case, the node 1 does not replace the forwarding path, but controls, according to the control policy, the transmit end 1 to reduce a sending rate of the service flow 1.

After determining the control policy based on the location information of the second network device, the first network device performs a corresponding operation by using the control policy, to resolve the congestion that affects the first service flow. The following describes operations corresponding to different control policies.

1. When the second network device is the last-hop network device, or the second network device is the intermediate network device and the first network device has no other forwarding path that can be used as a replacement, the first network device controls, according to the control policy, a target transmit end to reduce a sending rate of a target service flow. The target transmit end includes a first transmit end and/or a second transmit end, and the target service flow includes the first service flow and/or a second service flow. The target service flow is a service flow whose rate needs to be reduced. The first transmit end is configured to send the first service flow, and the second transmit end is configured to send the second service flow. The second service flow and the first service flow correspond to a same queue in the second network device, and a current sending rate of the second service flow is greater than a subscription rate. In other words, the first network device may control, according to the control policy, the first transmit end to reduce the sending rate of the first service flow, and/or the first network device may control, according to the control policy, the second transmit end to reduce the sending rate of the second service flow.

Further, when the queue allocated by the second network device to the first service flow includes only the first service flow, or the queue allocated by the second network device to the first service flow includes the second service flow and the sending rate of the second service flow is less than the corresponding subscription rate, the first network device controls the first transmit end to reduce the sending rate of the first service flow. When the queue allocated by the second network device to the first service flow further includes the second service flow and the sending rate of the second service flow is greater than the subscription rate, the first network device may control the second transmit end to reduce the sending rate of the second service flow, to prevent the service flow whose sending rate exceeds the subscription rate from occupying excessive bandwidth.

For the first transmit end, the first network device determines a first expected sending rate of the first service flow based on a quantity of received first-type packets, where the first expected sending rate is less than a current sending rate of the first service flow. The first network device sends the first expected sending rate to the first transmit end, to enable the first transmit end to send the first service flow based on the first expected sending rate. The first-type packet is a packet that includes a congestion mark and that belongs to the first service flow. The first expected sending rate is negatively correlated with the quantity of the first-type packets. For example, a relationship is indicated by $Rate1=Rate0*(1-\alpha)$, where $Rate0$ represents the current sending rate of the first service flow, $Rate1$ represents the first expected sending rate, and $\alpha$ represents a proportion of the received first-type packets that carry the congestion mark. The congestion mark included in the first-type packet may be an explicit congestion notification (ECN). The ECN is a flow-based end-to-end flow control technology that implements end-to-end congestion control. Further, when congestion occurs at an egress port of a network device and an ECN threshold is reached, the network device is triggered to mark a packet by using an ECN field in a packet header, to indicate that the packet encounters the network congestion. Once a receive end finds that the ECN of the packet is marked, the receive end generates a congestion notification packet (CNP) and sends the CNP packet to the transmit end. The CNP packet includes information about a service flow that causes the congestion. After receiving the packet, the transmit end reduces a sending rate of the corresponding flow, to relieve the congestion of the network device and avoid a packet loss. In the foregoing manner of sending the CNP packet by the transmit end, the receive end needs to continuously adjust the sending rate, and a congestion relief process is long. However, in this application, the first network device determines the expected sending rate of the first service flow based on a quantity of packets marked with the ECN, and notifies the transmit end, so that time needed by the transmit end to adjust the rate can be shortened, and congestion on the first service flow can be quickly eliminated.

For the second transmit end, the first network device determines a second expected sending rate of the second service flow based on a quantity of received second-type packets, where the second expected rate is less than a current sending rate of the second service flow. The first network device sends the second expected sending rate to the first transmit end, to enable the second transmit end to send the second service flow based on the second expected sending rate. The second-type packet is a packet that includes a congestion mark and that belongs to the second service flow, and the second expected sending rate is negatively correlated with the quantity of the second-type packets.

In some application scenarios, the first network device may not be capable of directly controlling the transmit end of the service flow. Based on this, this embodiment of this application provides an indirect control manner. Further, the first network device obtains a sending rate and a subscription rate of each service flow in a current statistical periodicity. The first network device adds, based on the sending rate and the subscription rate of the service flow, a target mark to a packet corresponding to the service flow. The first network device sends, through a forwarding path of the service flow, the packet to which the target mark is added, to enable a receive end of the target service flow to send a rate reduction notification to a target transmit end based on the congestion mark in the packet. The rate reduction notification indicates the target transmit end to reduce the sending rate of the target service flow, and the congestion mark in the packet is added by the second network device based on the target mark in the packet. The target mark indicates a relationship between the sending rate and the subscription rate of the target service flow, for example, whether the sending rate is greater than, equal to, or less than the subscription rate.

Adding, by the first network device based on the sending rate and the subscription rate of the service flow, the target mark to the packet corresponding to the service flow may be implemented in the following several cases.

When the sending rate of the service flow is less than the subscription rate, a first mark is added to the packet.

When the sending rate of the service flow is greater than or equal to the subscription rate, and the sending rate in the current statistical periodicity is greater than a sending rate of the service flow in a previous statistical periodicity, a second mark is added to the packet.

In this embodiment, the first network device may collect statistics on the sending rate of each service flow based on a preset periodicity, and add different marks based on a value relationship between the sending rate of the service flow and a corresponding subscription rate. Further, when a sending rate of a service flow is less than a subscription rate, a first mark is added to a packet corresponding to the service flow, where the first mark indicates that the sending rate is less than the subscription rate. When a sending rate of a service flow is greater than or equal to a subscription rate, and the sending rate in a current statistical periodicity is greater than a sending rate in a previous statistical periodicity, a second mark is added to a packet corresponding to the service flow. An ECN threshold corresponding to the first mark is high, and an ECN threshold corresponding to the second mark is low. When network congestion occurs, a congestion mark is preferentially added to the packet carrying the second mark. That is, when the network congestion occurs, a rate of a service flow whose sending rate exceeds the subscription rate is preferentially reduced. The adding different marks to the packet corresponding to the service flow may be modifying a differentiated services code point (DSCP) field in the packet, where the DSCP field occupies six bits, and a corresponding value ranges from 0 to 63. The DSCP field is modified to indicate different marks.

Further, for a case in which the sending rate of the service flow is greater than or equal to the subscription rate, division may be further performed at a finer granularity. Further, when the sending rate of the service flow is greater than or equal to the subscription rate, the sending rate of the service flow is less than the sending rate of the service flow in the previous statistical periodicity, and a difference between the sending rate in the previous statistical periodicity and the sending rate of the service flow in the current statistical periodicity is greater than a first threshold, the first mark is added to the packet corresponding to the service flow. In other words, when the sending rate of the service flow in the current statistical periodicity is greater than or equal to the subscription rate, but the sending rate in the current statistical periodicity is less than the sending rate in the previous statistical periodicity, and the sending rate in the previous statistical periodicity minus the sending rate in the current statistical periodicity is greater than the first threshold, it indicates that the sending rate of the service flow is reduced greatly. To avoid further reduction, the first mark is added to the packet of the service flow. Because the ECN threshold corresponding to the first mark is high, when the network congestion occurs, the sending rate of the service flow is not preferentially reduced.

When the sending rate of the service flow is greater than or equal to the subscription rate, the sending rate of the service flow is less than the sending rate of the service flow in the previous statistical periodicity, and a difference between the sending rate of the service flow in the previous statistical periodicity and the sending rate of the service flow in the current statistical periodicity is less than a second threshold, the second mark is added to the packet corresponding to the service flow. In other words, when the sending rate of the service flow in the current statistical periodicity is greater than or equal to the subscription rate, but the sending rate in the current statistical periodicity is less than the sending rate in the previous statistical periodicity and the sending rate in the previous statistical periodicity minus the sending rate in the current statistical periodicity is less than the second threshold, it indicates that the sending rate of the service flow is reduced slowly. To preferentially reduce the sending rate of the service flow when the network congestion occurs, the service flow is used as a target service flow, and a second mark is added to the packet of the target service flow. Because the ECN threshold corresponding to the second mark is low, when the network congestion occurs, the congestion mark is preferentially added to the packet carrying the second mark, to preferentially control the service flow that carries the congestion mark to reduce the rate.

2. The first network device replaces the forwarding path of the first service flow according to the control policy. Further, the first network device determines a target forwarding path when receiving a flowlet corresponding to the first service flow, where load of the target forwarding path is less than a load threshold, and the first network device forwards the flowlet through the target forwarding path. In an example, in this embodiment, when congestion is resolved by replacing the path, when receiving a new flowlet corresponding to the first service flow, the first network device may determine the target forwarding path based on a preset path selection algorithm, to forward a packet in the flowlet through the target forwarding path. The load of the target forwarding path is less than the load threshold, in other words, the first network device selects a path with small load as the target forwarding path.

To ensure that packets in a same flowlet are forwarded through a same forwarding path, after determining the target forwarding path, the first network device updates a flow table corresponding to the first service flow, where the flow table includes an egress port identifier corresponding to the target forwarding path. After the flow table is updated, when receiving the packets in the same flowlet, the first network device forwards the packets based on an egress port recorded in the flow table, to ensure that the packets in the same flowlet are forwarded through a same path and there is no risk of disorder.

In addition, the first network device may further implement SLA latency assurance through differentiated control while implementing SLA bandwidth assurance through the differentiated control. When differentiated latency control is implemented, rate coordination between a plurality of network devices needs to be implemented. For example, a packet of the first service flow and a packet of the second service flow correspond to a same queue on a forwarding device. A transmission latency of the second service flow is 52 μs, and a subscription latency is 100 μs. A transmission latency of the first service flow is 52 μs, and a subscription latency is 20 μs. The latency of the second service flow is met, and a transmission rate of the second service flow may be increased or maintained. The latency of the first service flow is not met, and a transmission rate of the first service flow may be reduced. However, network congestion may be caused by the second service flow, and reducing the sending rate of the first service flow cannot resolve the congestion problem.

Based on this, this embodiment provides a collaboration mechanism between a plurality of devices to implement latency assurance. Further, the first network device determines a transmission latency of the first service flow based on the plurality of groups of measurement results in the measurement packet. When the transmission latency is greater than a subscription latency, the first network device adds a latency non-compliance mark to a packet corresponding to the first service flow. The first network device forwards the packet through the forwarding path, to enable the forwarding device on the forwarding path to add, after receiving the packet, the latency non-compliance mark and a smallest subscription latency to a packet corresponding to a second service flow that passes through the same queue as the first service flow. The smallest subscription latency is a smallest latency in subscription latencies corresponding to different service flows that pass through the same queue. For example, the first network device is the node 1 in FIG. 1. The node 1 determines, based on a queue length in each INT field in the fed-back measurement packet and an egress port, a corresponding queuing latency when the forwarding device that adds the INT field forwards the packet of the service flow 1, and adds queuing latencies of all hops to obtain an end-to-end transmission latency.

In other words, when the transmission latency of the first service flow is greater than the subscription latency, the first network device adds a latency non-compliance mark to the packet of the first service flow, and forwards the packet normally. After receiving the packet, the forwarding device finds, through parsing, that the packet includes the latency non-compliance mark. In addition, a queue in which the packet is located further corresponds to another service flow, and the forwarding device adds the latency non-compliance mark and the smallest subscription latency to packets corresponding to service flows that pass through the same queue. For example, the first network device is the node 1 in FIG. 1, and the node 1 determines that the transmission latency of the service flow 1 is greater than the subscription latency, adds a latency non-compliance mark to a packet 2 of the service flow 1, and sends the packet 2 to the node 3. After receiving the packet 2 carrying the latency non-compliance mark, the node 3 finds that a packet 3 of a service flow 3 and a packet 4 of a service flow 4 pass through the same queue as the packet 1, and the node 3 separately adds the latency non-compliance mark and a smallest subscription latency to the packet 3 and the packet 4. If a subscription latency of the service flow 1 is 52 μs, a subscription latency of the service flow 3 is 50 μs, and a subscription latency of the service flow 4 is 80 μs, the smallest subscription latency is 50 μs.

When the packet to which the latency non-compliance mark and the smallest subscription latency are added is forwarded to the receive end, the receive end generates a third-type packet based on the foregoing packet, where the third-type packet includes the latency non-compliance mark and the smallest subscription latency. The receive end feeds back the third-type packet to the first network device or the transmit end, so that the first network device or the transmit end controls the sending rate of the service flow based on the third-type packet.

Further, when the first network device receives the third-type packet carrying the latency non-compliance mark, the first network device determines a third expected transmission rate based on the smallest subscription latency in the third-type packet and a transmission latency of a service flow corresponding to the third-type packet. The first network device sends the third expected rate to a transmit end of the service flow corresponding to the third-type packet, to enable the transmit end to send the service flow based on the third expected sending rate. Further, the third expected transmission rate may be determined as R1=R0*(1−latency/Lat_R), where R1 represents the third expected rate, R0 represents a current rate of the service flow corresponding to the third-type packet, latency represents the transmission latency of the service flow, and Lat_R represents the smallest subscription latency.

When the third-type packet is directly fed back to the transmit end, the transmit end determines a third expected transmission rate based on the smallest subscription latency in the third-type packet and a transmission latency of a service flow corresponding to the third-type packet, and the transmit end sends the service flow based on the third expected transmission rate.

Figure 4A:
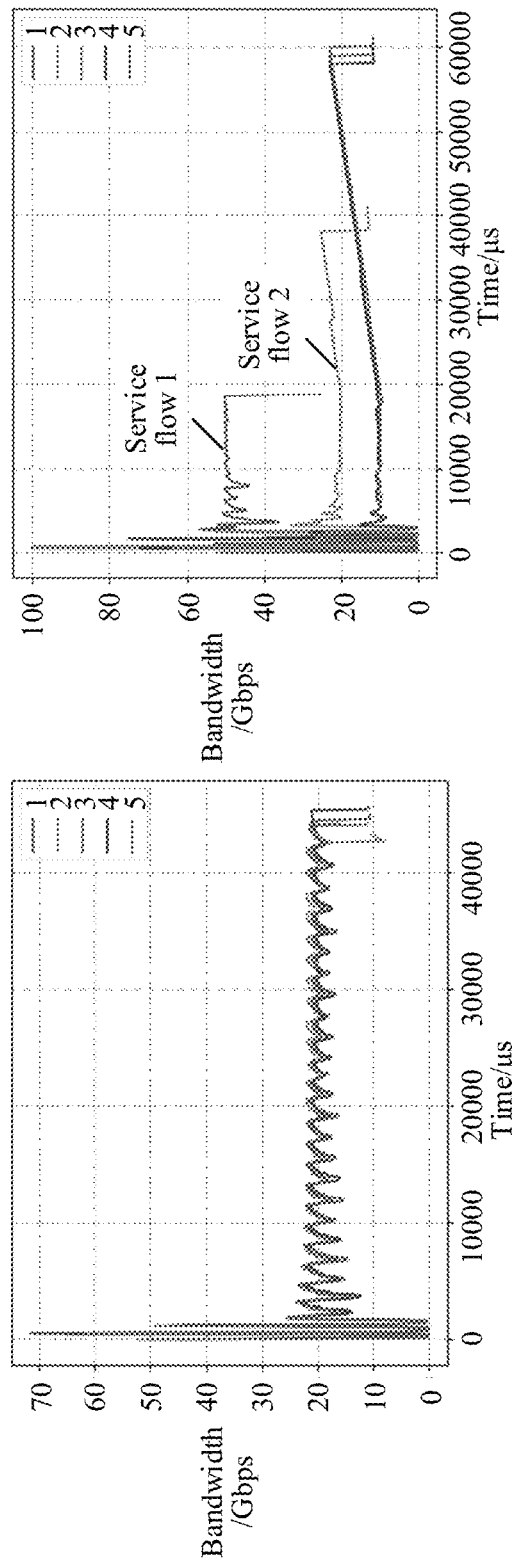
FIG. 4A is a schematic diagram of bandwidth allocation according to an embodiment of this application.

For case of understanding of an implementation effect of the technical solution provided in this embodiment of this application, refer to a schematic diagram of a general protocol stack shown in FIG. 4A. In this scenario, five transmit ends simultaneously send packets to one receive end. Bandwidth of an ingress port of the receive end is 100 Gbps, subscription bandwidth of a service flow 1 is 50 Gbps, subscription bandwidth of a service flow 2 is 20 Gbps, and other three service flows have no bandwidth requirement. In conventional bandwidth allocation, the bandwidth of the ingress ports of the receive end is evenly allocated, and bandwidth allocated to each service flow is 20 Gbps. As a result, subscription bandwidth of the service flow 1 cannot be met, as shown in the left figure of FIG. 4A. According to the technical solution provided in this embodiment of this application, bandwidth of the service flow 1 can be stable at 50 Gbps within 10 μs, bandwidth of the service flow 2 can be stable at 20 Gbps, and the remaining three service flows fairly share remaining bandwidth, as shown in the right figure of FIG. 4A.

Figure 4B:
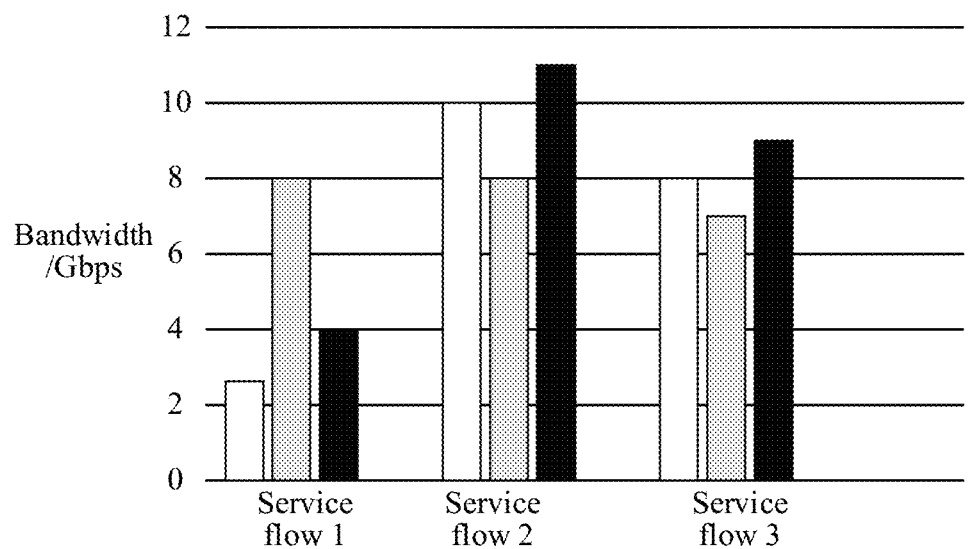
FIG. 4B is another schematic diagram of bandwidth allocation according to an embodiment of this application.

Refer to a schematic diagram of a specific protocol stack shown in FIG. 4B. In this scenario, three transmit ends simultaneously send packets to one receive end, and bandwidth of an ingress port of the receive end is 25 Gbps. Subscription bandwidth of a service flow 1 is 5 Gbps, subscription bandwidth of a service flow 2 is 10 Gbps, and subscription bandwidth of a service flow 3 is 8 Gbps. In FIG. 4B, a white box represents subscription bandwidth, a gray box represents bandwidth allocated by using a conventional control algorithm, and a black box represents bandwidth allocated by using the solution of this application. It can be learned from FIG. 4B that, when the bandwidth is allocated by using the conventional control algorithm, large bandwidth is allocated to the service flow 1, and consequently, bandwidth requirements of the service flow 2 and the service flow 3 cannot be met. However, subscription bandwidth of each service flow can be met by using the technical solution provided in this application.

Figure 4C:
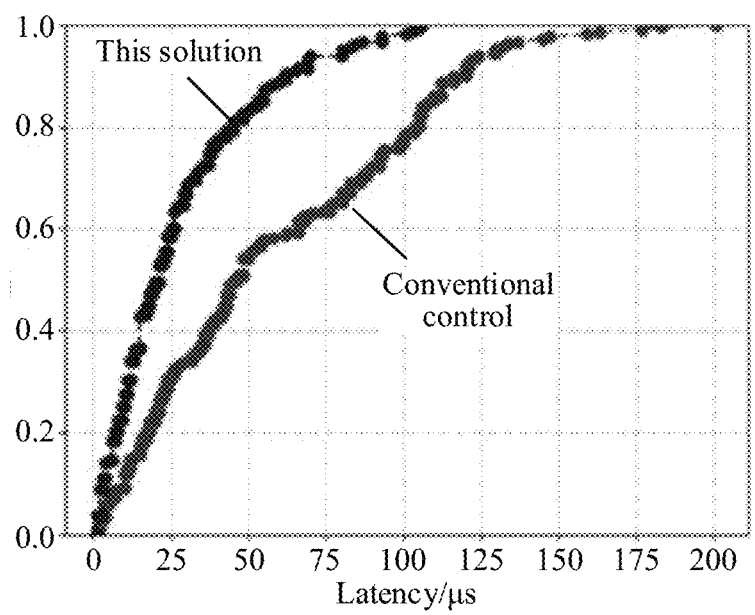
FIG. 4C is a schematic diagram of transmission latency comparison according to an embodiment of this application.

Refer to a schematic diagram of transmission latency assurance shown in FIG. 4C. In this scenario, eight transmit ends simultaneously send packets to one receive end, the eight transmit ends correspond to 218 service flows in total, and subscription latencies of some of the service flows are 100 μs. In FIG. 4C, a horizontal coordinate represents a transmission latency (μs), and a horizontal coordinate represents a distribution probability of a transmission latency of a service flow. For example, when a transmission latency in a simulation line corresponding to this solution is 50 μs, a corresponding distribution probability is 0.8, in an example, transmission latencies of 80% of the 218 service flows are less than 50 μs. When a transmission latency is 100 μs, a corresponding distribution probability is 1, in an example, transmission latencies of 100% of the 218 service flows are less than 100 μs. It can be learned from two simulation curves in FIG. 4C that, according to the technical solution provided in this embodiment of this application, when network congestion occurs, SLA latency assurance of the service flow can be met.

Based on the foregoing method embodiment, embodiments of this application provide a network congestion control apparatus and a network device. The following provides descriptions with reference to the accompanying drawings.

Figure 5:
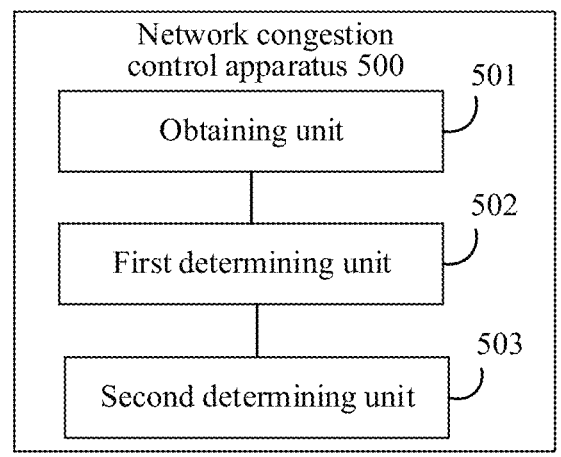
FIG. 5 is a diagram of a structure of a network congestion control apparatus according to an embodiment of this application.

FIG. 5 is a diagram of a structure of a network congestion control apparatus according to an embodiment of this application. An apparatus 500 may implement a function of the first network device in the foregoing method embodiments. The apparatus may include an obtaining unit 501, a first determining unit 502, and a second determining unit 503.

The obtaining unit 501 is configured to obtain a measurement packet, where the measurement packet includes a plurality of groups of measurement results corresponding to a first service flow, and each group of measurement results includes an identifier of a forwarding device on a forwarding path of the first service flow and a measurement value corresponding to the forwarding device. For specific implementation of the first determining unit 501, refer to related descriptions of S301.

The first determining unit 502 is configured to determine, based on the plurality of groups of measurement results, a congested second network device on the forwarding path. For specific implementation of the first determining unit 502, refer to related descriptions of S302.

The second determining unit 503 is configured to determine a control policy based on location information of the second network device, where the control policy is used to resolve congestion that affects the first service flow, and the location information of the second network device indicates a role of the second network device on the forwarding path. For specific implementation of the second determining unit 503, refer to related descriptions of S303.

In an implementation, the role of the second network device on the forwarding path includes a last-hop network device or an intermediate network device. When the second network device is the intermediate network device and the first network device has another forwarding path that can be used as a replacement, the apparatus further includes a replacement unit configured to replace the forwarding path of the first service flow according to the control policy. When the second network device is the last-hop network device, or when the second network device is the intermediate network device and the first network device has no other forwarding path that can be used as a replacement, the apparatus further includes a control unit configured to control, according to the control policy, a target transmit end to reduce a sending rate of a target service flow, where the target transmit end includes a first transmit end and/or a second transmit end, the target service flow includes the first service flow and/or a second service flow, the first transmit end is configured to send the first service flow, the second transmit end is configured to send the second service flow, the second service flow and the first service flow correspond to a same queue in the second network device, and a current sending rate of the second service flow is greater than a subscription rate.

In an implementation, the control unit is further configured to determine a first expected sending rate of the first service flow based on a quantity of received first-type packets, where the first expected sending rate is less than a current sending rate of the first service flow, and the first-type packet is a packet that includes a congestion mark and that belongs to the first service flow, and send the first expected sending rate to the first transmit end, to enable the first transmit end to send the first service flow based on the first expected sending rate.

In an implementation, the control unit is further configured to determine a second expected sending rate of the second service flow based on a quantity of received second-type packets, where the second expected sending rate is less than the current sending rate of the second service flow, and the second-type packet is a packet that includes a congestion mark and that belongs to the second service flow, and send the second expected sending rate to the second transmit end, to enable the second transmit end to send the second service flow based on the second expected sending rate.

In an implementation, the control unit is further configured to obtain a sending rate and a subscription rate of the target service flow in a current statistical periodicity, add, based on the sending rate and the subscription rate of the target service flow, a target mark to a packet corresponding to the target service flow, where the target mark indicates a relationship between the sending rate and the subscription rate of the target service flow, and send, through a forwarding path of the target service flow, the packet to which the target mark is added, to enable a receive end of the target service flow to send a rate reduction notification to the target transmit end based on a congestion mark in the packet, where the rate reduction notification indicates the target transmit end to reduce the sending rate of the target service flow, and the congestion mark in the packet is added by the second network device based on the target mark in the packet.

In an implementation, the control unit is further configured to, when the sending rate of the target service flow is less than the subscription rate, add a first mark to the packet, or when the sending rate of the target service flow is greater than or equal to the subscription rate, and the sending rate is greater than a sending rate of the target service flow in a previous statistical periodicity, add a second mark to the packet.

In an implementation, the control unit is further configured to, when the sending rate of the target service flow is greater than or equal to the subscription rate, the sending rate of the target service flow is less than the sending rate of the target service flow in the previous statistical periodicity, and a difference between the sending rate of the target service flow in the previous statistical periodicity and the sending rate of the target service flow in the current statistical periodicity is greater than a first threshold, add the first mark to the packet.

In an implementation, the control unit is further configured to when the sending rate of the target service flow is greater than or equal to the subscription rate, the sending rate of the target service flow is less than the sending rate of the target service flow in the previous statistical periodicity, and a difference between the sending rate of the target service flow in the previous statistical periodicity and the sending rate of the target service flow in the current statistical periodicity is less than a second threshold, add the second mark to the packet.

In an implementation, the replacement unit is further configured to determine a target forwarding path when receiving a flowlet corresponding to the first service flow, where load of the target forwarding path is less than a load threshold, and forward the flowlet through the target forwarding path.

In an implementation, the apparatus further includes an update unit.

The update unit is configured to update a flow table corresponding to the first service flow, where the flow table includes an egress port identifier corresponding to the target forwarding path.

In an implementation, the apparatus further includes a third determining unit, an adding unit, and a sending unit.

The third determining unit is configured to determine a transmission latency of the first service flow based on the plurality of groups of measurement results.

When the transmission latency is greater than a subscription latency, the adding unit is configured to add a latency non-compliance mark to a packet corresponding to the first service flow.

The sending unit is configured to forward the packet through the forwarding path, to enable the forwarding device on the forwarding path to add, after receiving the packet, the latency non-compliance mark and a smallest subscription latency to a packet corresponding to the second service flow that passes through the same queue as the first service flow, where the smallest subscription latency is a smallest latency in subscription latencies corresponding to different service flows that pass through the same queue.

In an implementation, the apparatus further includes a fourth determining unit and a sending unit.

The fourth determining unit is configured to, when receiving a third-type packet carrying the latency non-compliance mark, determine a third expected transmission rate based on a smallest subscription latency in the third-type packet and a transmission latency of a service flow corresponding to the third-type packet.

The sending unit is configured to send the third expected rate to a transmit end of the service flow corresponding to the third-type packet, to enable the transmit end to send the service flow based on the third expected rate.

It should be noted that, for specific implementation of the units in this embodiment, reference may be made to the foregoing method embodiments. Details are not described herein again in this embodiment.

Figure 6:
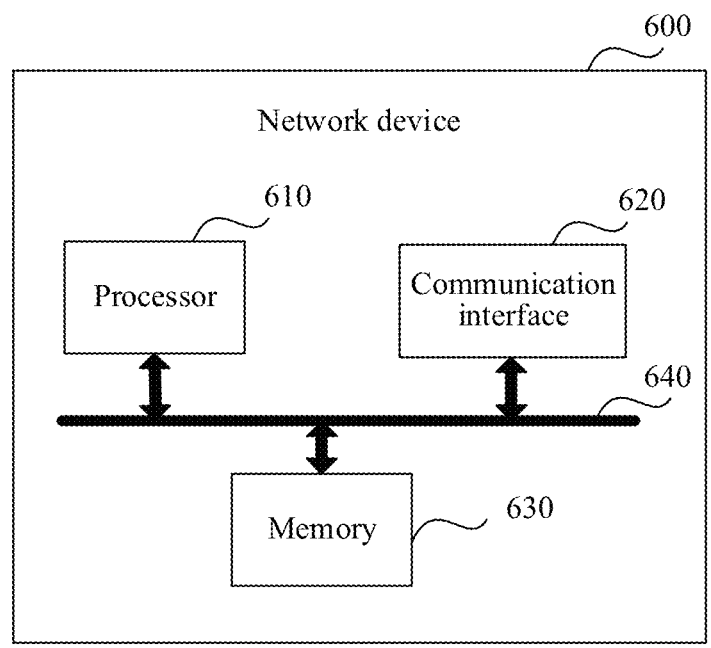
FIG. 6 is a diagram of a structure of a network device according to an embodiment of this application.

FIG. 6 is a schematic diagram of a structure of a network device according to an embodiment of this application. The network device may be, for example, the first network device or the second network device in the foregoing method embodiments.

Refer to FIG. 6. A network device 600 includes a processor 610, a communication interface 620, and a memory 630. There may be one or more processors 610 in the packet forwarding device 600. One processor is used as an example in FIG. 6. In this embodiment of this application, the processor 610, the communication interface 620, and the memory 630 may be connected by using a bus system or in another manner. In FIG. 6, an example in which the processor 610, the communication interface 620, and the memory 630 are connected by using a bus system 640 is used.

The processor 610 may be a central processing unit (CPU), a network processor (NP), or a combination of the CPU and the NP. The processor 610 may further include a hardware chip. The hardware chip may be an application-specific integrated circuit (ASIC), a programmable logic device (PLD), or a combination thereof. The PLD may be a complex PLD (CPLD), a field-programmable logic gate array (FPGA), a generic array logic (GAL), or any combination thereof.

When the network device is the first network device, the processor 610 may perform related functions such as obtaining the measurement packet, determining, based on the plurality of groups of measurement results included in the measurement packet, the congested second network device on the forwarding path, and determining the control policy based on the location information of the second network device in the foregoing method embodiments.

The communication interface 620 is configured to receive and send a packet. Further, the communication interface 620 may include a receiving interface and a sending interface. The receiving interface may be configured to receive a packet, and the sending interface may be configured to send a packet. There may be one or more communication interfaces 620.

The memory 630 may include a volatile memory, for example, a random-access memory (RAM). The memory 630 may alternatively include a non-volatile memory, for example, a flash memory, a hard disk drive (HDD), or a solid-state drive (SSD). The memory 630 may alternatively include a combination of the foregoing types of memories. The memory 630 may store, for example, the control policy mentioned above.

Optionally, the memory 630 stores an operating system and a program, an executable module, or a data structure, a subset thereof, or an extended set thereof. The program may include various operation instructions for implementing various operations. The operating system may include various system programs, to implement various basic services and process a hardware-based task. The processor 610 may read the program in the memory 630, to implement the method provided in embodiments of this application.

The memory 630 may be a storage device in the network device 600, or may be a storage apparatus independent of the network device 600.

The bus system 640 may be a Peripheral Component Interconnect (PCI) bus, an Extended Industry Standard Architecture (EISA) bus, or the like. The bus system 640 may be classified into an address bus, a data bus, a control bus, and the like. For case of representation, only one thick line is used to represent the bus in FIG. 6, but this does not mean that there is only one bus or only one type of bus.

Figure 7:
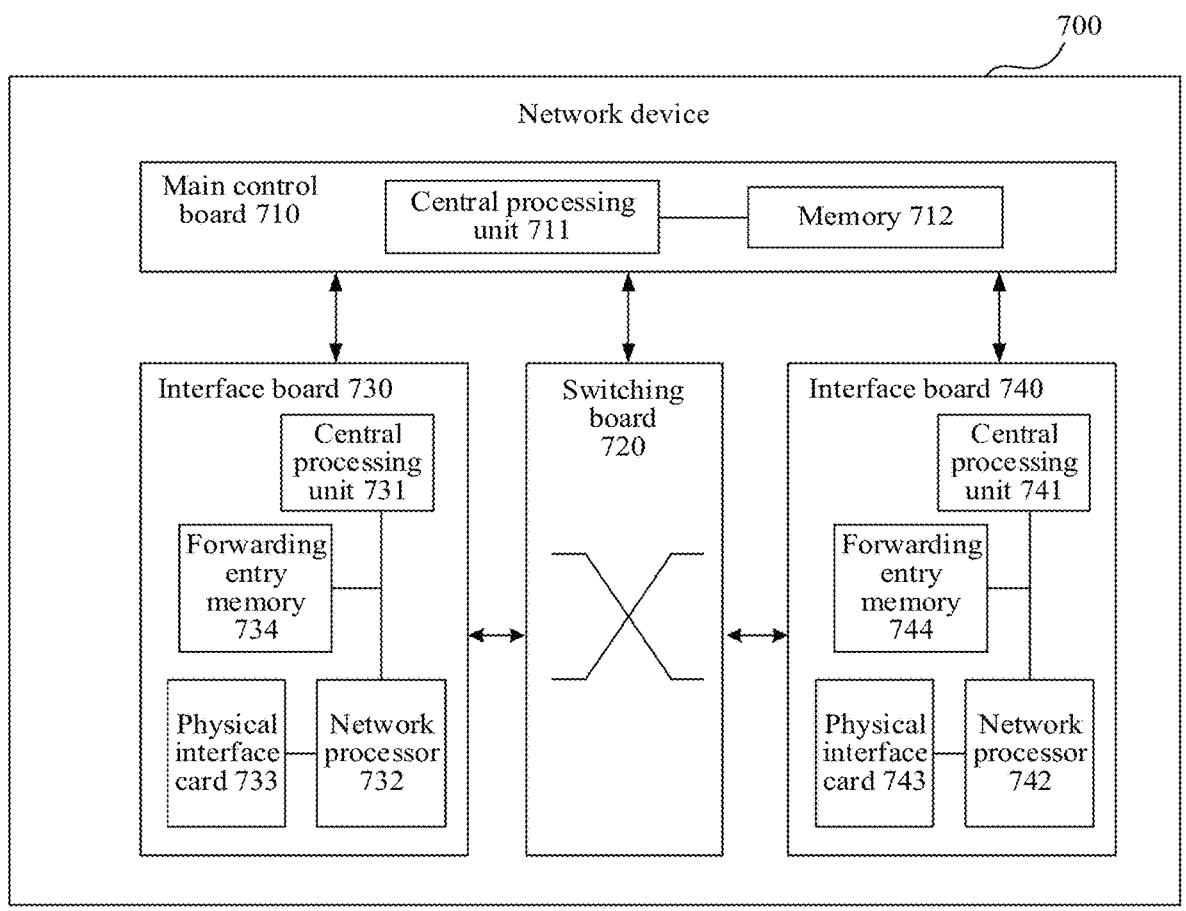
FIG. 7 is a diagram of a structure of another network device according to an embodiment of this application.

FIG. 7 is a schematic diagram of a structure of another network device 700 according to an embodiment of this application. The network device 700 may be configured as the first network device or the second network device in the foregoing embodiments.

The network device 700 includes a main control board 710 and an interface board 730.

The main control board 710 is also referred to as a main processing unit (MPU) or a route processor card. The main control board 710 controls and manages components in the network device 700, including route calculation, device management, device maintenance, and protocol processing. The main control board 710 includes a CPU 711 and a memory 712.

The interface board 730 is also referred to as a line processing unit (LPU), a line card, or a service board. The interface board 730 is configured to provide various service interfaces, and forward a data packet. The service interfaces include but are not limited to an Ethernet interface, a Packet over Synchronous Optical Networking (SONET)/Synchronous Digital Hierarchy (SDH) (or POS) interface, and the like. The Ethernet interface is, for example, a flexible Ethernet service interface (FlexE Clients). The interface board 730 includes a CPU 731, an NP 732, a forwarding entry memory 734, and a physical interface card (PIC) 733.

The CPU 731 on the interface board 730 is configured to control and manage the interface board 730 and communicate with the CPU 711 on the main control board 710.

The NP 732 is configured to forward a packet. A form of the NP 732 may be a forwarding chip. Further, processing on an uplink packet includes processing at a packet ingress interface and forwarding table lookup, and processing on a downlink packet includes forwarding table lookup and the like.

The physical interface card 733 is configured to implement a physical layer interconnection function. Original traffic enters the interface board 730 from the physical interface card 733, and a processed packet is sent out from the physical interface card 733. The physical interface card 733 includes at least one physical interface. The physical interface is also referred to as a physical port. The physical interface card 733, also referred to as a subcard, may be mounted on the interface board 730, and is responsible for converting an optical/electrical signal into a packet, performing validity check on the packet, and forwarding the packet to the NP 732 for processing. In some embodiments, the CPU 731 on the interface board 730 may also perform a function of the NP 732, for example, implement software forwarding based on a general-purpose CPU. In this case, the NP 732 is not needed in the physical interface card 733.

Optionally, the network device 700 includes a plurality of interface boards. For example, the network device 700 further includes an interface board 740. The interface board 740 includes a CPU 741, an NP 742, a forwarding entry memory 744, and a physical interface card 743.

Optionally, the network device 700 further includes a switching board 720. The switching board 720 may also be referred to as a switch fabric unit (SFU). When the network device has a plurality of interface boards 730, the switching board 720 is configured to complete data exchange between the interface boards. For example, the interface board 730 and the interface board 740 may communicate with each other via the switching board 720.

The main control board 710 is coupled to the interface board 730. For example, the main control board 710, the interface board 730, the interface board 740, and the switching board 720 are connected to a system backplane through a system bus to implement interworking. In a possible implementation, an inter-process communication (IPC) channel is established between the main control board 710 and the interface board 730, and communication is performed between the main control board 710 and the interface board 730 through the IPC channel.

Logically, the network device 700 includes a control plane and a forwarding plane. The control plane includes the main control board 710 and the CPU 731. The forwarding plane includes components used for forwarding, for example, the forwarding entry memory 734, the physical interface card 733, and the NP 732. The control plane performs functions such as routing, generating a forwarding table, processing signaling and a protocol packet, and configuring and maintaining a device status. The control plane delivers the generated forwarding table to the forwarding plane. At the forwarding plane, by performing table lookup based on the forwarding table delivered by the control plane, the NP 732 forwards a packet received by the physical interface card 733. The forwarding table delivered by the control plane may be stored in the forwarding entry memory 734. In some embodiments, the control plane and the forwarding plane may be completely separated, and are not on a same device.

It should be understood that the obtaining unit 501, the first determining unit 502, the second determining unit 503, and the like in the network congestion control apparatus 500 may be equivalent to the central processing unit 711 or the central processing unit 731 in the network device 700.

It should be understood that, in this embodiment of this application, an operation on the interface board 740 is consistent with an operation on the interface board 730. For brevity, details are not described again. It should be understood that the network device 700 in this embodiment may correspond to the first network device or the second network device in the foregoing method embodiments. The main control board 710, and the interface board 730 and/or the interface board 740 in the network device 700 may implement the functions and/or the steps implemented by the first network device or the second network device in the foregoing method embodiments. For brevity, details are not described herein again.

It can be understood that, there may be one or more main control boards. When there is a plurality of main control boards, the main control boards may include an active main control board and a standby main control board. There may be one or more interface boards. A network device having a stronger data processing capability provides more interface boards. There may also be one or more physical interface cards on the interface board. There may be no switching board or one or more switching boards. When there is a plurality of switching boards, load balancing and redundancy backup may be implemented together. In a centralized forwarding architecture, the network device may not need the switching board, and the interface board provides a function of processing service data in an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than that of a device in the centralized architecture. Optionally, the network device may alternatively be in a form in which there is only one card. In an example, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. The device in this form (for example, a network device such as a low-end switch or router) has a weak data exchange and processing capability. A specific architecture that is to be used depends on a specific networking deployment scenario.

In some possible embodiments, the first network device or the second network device may be implemented as a virtualized device. For example, the virtualized device may be a virtual machine (VM) on which a program having a packet sending function is run, and the virtual machine is deployed on a hardware device (for example, a physical server). The virtual machine is a complete software-simulated computer system that has complete hardware system functions and that runs in an entirely isolated environment. The virtual machine may be configured as a first network device or a second network device. For example, the first network device or the second network device may be implemented based on a general-purpose physical server in combination with a network functions virtualization (NFV) technology. The first network device or the second network device is a virtual host, a virtual router, or a virtual switch. After reading this application, with reference to the NFV technology, a person skilled in the art may virtualize, on the general-purpose physical server, the first network device or the second network device having the foregoing functions. Details are not described herein.

It should be understood that the network devices in the foregoing product forms separately have any function of the first network device or the second network device in the foregoing method embodiments, and details are not described herein.

An embodiment of this application further provides a chip, including a processor and an interface circuit. The interface circuit is configured to receive instructions and transmit the instructions to the processor. The processor may be, for example, a specific implementation form of the network congestion control apparatus 500 shown in FIG. 5, and may be configured to perform the foregoing packet transmission method. The processor is coupled to a memory. The memory is configured to store a program or instructions. When the program or the instructions are executed by the processor, a chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory (ROM). The memory and the processor may be integrated into a same chip, or may be separately disposed on different chips. A type of the memory and a manner of disposing the memory and the processor are not limited in this application.

For example, the chip system may be an FPGA, an ASIC, a system on chip (SoC), a CPU, a network processor (NP), a digital signal processor (DSP), a micro controller unit (MCU), or a programmable controller (or programmable logic device (PLD)) or another integrated chip.

An embodiment of this application further provides a computer-readable storage medium, including instructions or a computer program. When the instructions or the computer program is run on a computer, the computer is enabled to perform the network congestion control method provided in the foregoing embodiments.

An embodiment of this application further provides a computer program product, including instructions or a computer program. When the computer program product runs on a computer, the computer is enabled to perform the network congestion control method provided in the foregoing embodiments.

An embodiment of this application further provides a network system, including a first network device and a second network device. The first network device is configured to obtain a measurement packet, where the measurement packet includes a plurality of groups of measurement results corresponding to a first service flow, and each group of measurement results includes an identifier of a forwarding device on a forwarding path of the first service flow and a measurement value corresponding to the forwarding device, determine, based on the plurality of groups of measurement results, the congested second network device on the forwarding path, and determine a control policy based on location information of the second network device, where the control policy is used to resolve congestion that affects the first service flow, and the location information of the second network device indicates a role of the second network device on the forwarding path.

In an implementation, the role of the second network device on the forwarding path includes a last-hop network device or an intermediate network device. When the second network device is the intermediate network device and the first network device has another forwarding path that can be used as a replacement, the first network device is further configured to replace the forwarding path of the first service flow according to the control policy. When the second network device is the last-hop network device, or when the second network device is the intermediate network device and the first network device has no other forwarding path that can be used as a replacement, the first network device is further configured to control, according to the control policy, a target transmit end to reduce a sending rate of a target service flow, where the target transmit end includes a first transmit end and/or a second transmit end, the target service flow includes the first service flow and/or a second service flow, the first transmit end is configured to send the first service flow, the second transmit end is configured to send the second service flow, the second service flow and the first service flow correspond to a same queue in the second network device, and a current sending rate of the second service flow is greater than a subscription rate.

In an implementation, when controlling, according to the control policy, the target transmit end to reduce the sending rate of the target service flow, the first network device is configured to obtain a sending rate and a subscription rate of the target service flow in a current statistical periodicity, add, based on the sending rate and the subscription rate of the target service flow, a target mark to a packet corresponding to the target service flow, where the target mark indicates a relationship between the sending rate and the subscription rate of the target service flow, and send, through a forwarding path of the target service flow, the packet to which the target mark is added.

The second network device is configured to add a congestion mark to the packet based on the target mark in the packet, and send, through the forwarding path of the target service flow, the packet to which the congestion mark is added, to enable a receive end of the target service flow to send a rate reduction notification to the target transmit end based on the congestion mark in the packet, where the rate reduction notification indicates the target transmit end to reduce the sending rate of the target service flow.

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances so that embodiments of the present disclosure described herein can be implemented in other orders than the order illustrated or described herein. In addition, the terms "include", "have" and any other variants mean to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical service division and may be another division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the method in embodiments of this application. The foregoing storage medium includes any medium that can store program code, such as a Universal Serial Bus (USB) flash drive, a removable hard disk, a ROM, a RAM, a magnetic disk, or an optical disc.

A person skilled in the art should be aware that in the foregoing one or more examples, the services described in this application may be implemented by hardware, software, firmware, or any combination thereof. When the services are implemented by using the software, the services may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

In the foregoing specific implementations, the objectives, technical solutions, and benefits of this application are further described in detail. It should be understood that the foregoing descriptions are merely specific implementations of this application.

The foregoing embodiments are merely intended for describing the technical solutions of this application instead of limiting this application. Although this application is described in detail with reference to the foregoing embodiments, a person of ordinary skill in the art should understand that modifications may still be made to the technical solutions described in the foregoing embodiments or make equivalent replacements to some technical features thereof, without departing from the scope of the technical solutions of embodiments of this application.

What is claimed is:

1. A method implemented by a first network device, wherein the method comprises:

obtaining a measurement packet comprising groups of measurement results corresponding to a first service flow, wherein each of the groups comprises an identifier of a forwarding device on a first forwarding path of the first service flow and a measurement value corresponding to the forwarding device;

determining, based on the groups, a second network device that is congested and that is on the first forwarding path;

determining, based on location information of the second network device, a control policy to resolve congestion that affects the first service flow, wherein the location information indicates a role of the second network device on the first forwarding path, wherein the role comprises a last-hop network device or an intermediate network device;

replacing, according to the control policy, the first forwarding path when the second network device is the intermediate network device and the first network device has a second forwarding path that can be used as a replacement;

controlling, according to the control policy, a target transmit end to reduce a first sending rate of a target service flow when the second network device is the last-hop network device or when the second network device is the intermediate network device and the first network device does not have the second forwarding path that can be used as the replacement, wherein the target transmit end comprises a first transmit end or a second transmit end, wherein the target service flow comprises the first service flow or a second service flow, wherein the first transmit end is configured to send the first service flow, wherein the second transmit end is configured to send the second service flow, wherein the second service flow and the first service flow correspond to a same queue in the second network device, and wherein a first current sending rate of the second service flow is greater than a first subscription rate;

obtaining a second sending rate of the target service flow in a current statistical periodicity and a second subscription rate of the target service flow in the current statistical periodicity;

adding, based on the second sending rate and the second subscription rate, a target mark to a first packet corresponding to the target service flow to obtain a second packet, wherein the target mark indicates a relationship between the second sending rate and the second subscription rate; and sending, through a third forwarding path of the target service flow, the second packet to enable a receive end of the target service flow to send a rate reduction notification to the target transmit end based on a congestion mark in the second packet, wherein the rate reduction notification instructs the target transmit end to reduce the second sending rate, and wherein the congestion mark is based on the target mark.

2. The method of claim 1, further comprising:
determining, based on a quantity of received packets, an expected sending rate of the first service flow, wherein the expected sending rate is less than a second current sending rate of the first service flow, and wherein each of the received packets comprises a congestion mark and is of the first service flow; and
sending, to the first transmit end, the expected sending rate to enable the first transmit end to send the first service flow based on the expected sending rate.

3. The method of claim 1, further comprising:
determining, based on a quantity of received packets, an expected sending rate of the second service flow, wherein the expected sending rate is less than the first current sending rate, and wherein each of the received packets comprises a congestion mark and is of the second service flow; and
sending, to the second transmit end, the expected sending rate to enable the second transmit end to send the second service flow based on the expected sending rate.

4. The method of claim 1, wherein adding the target mark comprises:
adding a first mark to the first packet when the second sending rate is less than the second subscription rate to obtain the second packet; and
adding a second mark to the first packet when the second sending rate is greater than or equal to the second subscription rate and is greater than a third sending rate of the target service flow in a previous statistical periodicity to obtain the second packet.

5. The method of claim 4, further comprising:
identifying that the second sending rate is greater than or equal to the second subscription rate and is less than the third sending rate and a difference between the third sending rate and the second sending rate is greater than a threshold; and
adding, in response to identifying that the second sending rate is greater than or equal to the second subscription rate and is less than the third sending rate and the difference is greater than the threshold, the first mark to the first packet to obtain the second packet.

6. The method of claim 4, further comprising:
identifying that the second sending rate is greater than or equal to the second subscription rate and is less than the third sending rate and a difference between the third sending rate and the second sending rate is less than a threshold;
adding, in response to identifying that the second sending rate is greater than or equal to the second subscription rate and is less than the third sending rate and the difference is less than the threshold, the second mark to the first packet to obtain the second packet.

7. The method of claim 1, further comprising:
determining a target forwarding path when receiving a flowlet corresponding to the first service flow, wherein a load of the target forwarding path is less than a load threshold; and
forwarding the flowlet through the target forwarding path.

8. The method of claim 7, further comprising updating a flow table corresponding to the first service flow, wherein the flow table comprises an egress port identifier corresponding to the target forwarding path.

9. The method of claim 1, further comprising:
determining, based on the groups, a first transmission latency of the first service flow;
adding a latency non-compliance mark to a first packet corresponding to the first service flow when the first transmission latency is greater than a subscription latency; and
forwarding the first packet through the first forwarding path to enable the forwarding device to add, after receiving the first packet, the latency non-compliance mark and a first smallest subscription latency to a second packet corresponding to a second service flow that passes through a queue that is the same as the first service flow, wherein the first smallest subscription latency is in subscription latencies corresponding to different service flows that pass through the queue.

10. The method of claim 9, further comprising:
identifying that the first network device receives a packet carrying the latency non-compliance mark;
determining, in response to identifying that the first network device receives the packet and based on a second smallest subscription latency in the packet and a second transmission latency of a third service flow corresponding to the packet, an expected transmission rate; and
sending, to a transmit end of the third service flow, the expected transmission rate to enable the transmit end to send the third service flow based on the expected transmission rate.

11. A first network device comprising:
a memory configured to store instructions; and
one or more processors coupled to the memory and configured to execute the instructions to cause the first network device to:
obtain a measurement packet comprising groups of measurement results corresponding to a first service flow, wherein each of the groups comprises an identifier of a forwarding device on a first forwarding path of the first service flow and a measurement value corresponding to the forwarding device;
determine, based on the groups, a second network device that is congested and that is on the first forwarding path;
determine, based on location information of the second network device, a control policy to resolve congestion that affects the first service flow, wherein the location information indicates a role of the second network device on the first forwarding path, wherein the role comprises a last-hop network device or an intermediate network device;
replace, according to the control policy, the first forwarding path when the second network device is the intermediate network device and the first network device has a second forwarding path that can be used as a replacement;
control, according to the control policy, a target transmit end to reduce a first sending rate of a target service flow when the second network device is the last-hop network device or when the second network device is the intermediate network device and the first network device does not have the second forwarding path that can be used as the replacement, wherein the target transmit end comprises a first transmit end or a second transmit end, wherein the target service flow comprises the first service flow or a second service flow, wherein the first transmit end is configured to send the first service flow, wherein the second transmit end is configured to send the second service flow, wherein the second service flow and the first service flow correspond to a same queue in the second network device, and wherein a first current sending rate of the second service flow is greater than a first subscription rate;

obtain a second sending rate of the target service flow in a current statistical periodicity and a second subscription rate of the target service flow in the current statistical periodicity;

add, based on the second sending rate and the second subscription rate, a target mark to a first packet corresponding to the target service flow to obtain a second packet, wherein the target mark indicates a relationship between the second sending rate and the second subscription rate; and send, through a third forwarding path of the target service flow, the second packet to enable a receive end of the target service flow to send a rate reduction notification to the target transmit end based on a congestion mark in the second packet, wherein the rate reduction notification instructs the target transmit end to reduce the second sending rate, and wherein the congestion mark is based on the target mark.

12. The first network device of claim 11, wherein the one or more processors are further configured to execute the instructions to cause the first network device to:

determine, based on a quantity of received packets, an expected sending rate of the first service flow, wherein the expected sending rate is less than a second current sending rate of the first service flow, and wherein each of the received packets comprises a congestion mark and is of the first service flow; and send, to the first transmit end, the expected sending rate to enable the first transmit end to send the first service flow based on the expected sending rate.

13. The first network device of claim 11, wherein the one or more processors are further configured to execute the instructions to cause the first network device to:

determine, based on a quantity of received packets, an expected sending rate of the second service flow, wherein the expected sending rate is less than the first current sending rate, and wherein each of the received packets comprises a congestion mark and is of the second service flow; and send, to the second transmit end, the expected sending rate to enable the second transmit end to send the second service flow based on the expected sending rate.

14. The first network device of claim 11, wherein the one or more processors are further configured to execute the instructions to, cause the first network device to:

add a first mark to the first packet when the second sending rate is less than the second subscription rate to obtain the second packet; and add a second mark to the first packet when the second sending rate is greater than or equal to the second subscription rate and is greater than a third sending rate of the target service flow in a previous statistical periodicity to obtain the second packet.

15. The first network device of claim 14, wherein the one or more processors are further configured to execute the instructions to cause the first network device to:

identify that the second sending rate is greater than or equal to the second subscription rate and is less than the third sending rate and a difference between the third sending rate and the second sending rate is greater than a threshold; and add, in response to identifying that the second sending rate is greater than or equal to the second subscription rate and is less than the third sending rate and the difference is greater than the threshold, the first mark to the first packet to obtain the second packet.

16. A computer program product comprising computer-executable instructions that are stored on a non-transitory computer-readable storage medium and that, when executed by one or more processors, cause a first network device to:

obtain a measurement packet comprising groups of measurement results corresponding to a first service flow, wherein each of the groups comprises an identifier of a forwarding device on a forwarding path of the service flow and a measurement value corresponding to the forwarding device;

determine, based on the groups, a second network device that is congested and that is on the forwarding path;

determine, based on location information of the second network device, a control policy to resolve congestion that affects the first service flow, wherein the location information indicates a role of the second network device on the forwarding path, wherein the role comprises a last-hop network device or an intermediate network device;

replace, according to the control policy, the first forwarding path when the second network device is the intermediate network device and the first network device has a second forwarding path that can be used as a replacement;

control, according to the control policy, a target transmit end to reduce a first sending rate of a target service flow when the second network device is the last-hop network device or when the second network device is the intermediate network device and the first network device does not have the second forwarding path that can be used as the replacement, wherein the target transmit end comprises a first transmit end or a second transmit end, wherein the target service flow comprises the first service flow or a second service flow, wherein the first transmit end is configured to send the first service flow, wherein the second transmit end is configured to send the second service flow, wherein the second service flow and the first service flow correspond to a same queue in the second network device, and wherein a first current sending rate of the second service flow is greater than a first subscription rate;

obtain a second sending rate of the target service flow in a current statistical periodicity and a second subscription rate of the target service flow in the current statistical periodicity;

add, based on the second sending rate and the second subscription rate, a target mark to a first packet corresponding to the target service flow to obtain a second packet, wherein the target mark indicates a relationship between the second sending rate and the second subscription rate; and send, through a third forwarding path of the target service flow, the second packet to enable a receive end of the target service flow to send a rate reduction notification to the target transmit end based on a congestion mark in the second packet, wherein the rate reduction notification instructs the target transmit end to reduce the second sending rate, and wherein the congestion mark is based on the target mark.

17. The computer program product of claim 16, wherein the computer-executable instructions that, when executed by the one or more processors, cause the first network device to:

determine, based on a quantity of received packets, an expected sending rate of the first service flow, wherein the expected sending rate is less than a second current sending rate of the first service flow, and wherein each of the received packets comprises a congestion mark and is of the first service flow; and send, to the first transmit end, the expected sending rate to enable the first transmit end to send the first service flow based on the expected sending rate.

18. The computer program product of claim 16, wherein the computer-executable instructions that, when executed by the one or more processors, cause the first network device to:

determine, based on a quantity of received packets, an expected sending rate of the second service flow, wherein the expected sending rate is less than the first current sending rate, and wherein each of the received packets comprises a congestion mark and is of the second service flow; and send, to the second transmit end, the expected sending rate to enable the second transmit end to send the second service flow based on the expected sending rate.

19. The computer program product of claim 16, wherein the computer-executable instructions that, when executed by the one or more processors, cause the first network device to:

add a first mark to the first packet when the second sending rate is less than the second subscription rate to obtain the second packet; and add a second mark to the first packet when the second sending rate is greater than or equal to the second subscription rate and is greater than a third sending rate of the target service flow in a previous statistical periodicity to obtain the second packet.

20. The computer program product of claim 19, wherein the computer-executable instructions that, when executed by the one or more processors, cause the first network device to:

identify that the second sending rate is greater than or equal to the second subscription rate and is less than the third sending rate and a difference between the third sending rate and the second sending rate is greater than a threshold; and add, in response to identifying that the second sending rate is greater than or equal to the second subscription rate and is less than the third sending rate and the difference is greater than the threshold, the first mark to the first packet to obtain the second packet.

* * * * *